(12) United States Patent
Hubacher et al.

(10) Patent No.: US 6,507,905 B1
(45) Date of Patent: Jan. 14, 2003

(54) SYSTEM FOR MODIFYING A MASTER PARTITION TABLE OF A MASTER BOOT RECORD TO CREATE A PERSONALIZED LOCAL DATA DRIVE HAVING DEDICATED ALLOCATION FOR A SPECIFIED USER

(75) Inventors: Kenneth Hubacher, Cedar Park, TX (US); Dennis Sposato, Austin, TX (US); Philip C. Theiller, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/409,586

(22) Filed: Sep. 30, 1999

(51) Int. Cl.[7] .................. G06F 15/177; G06F 9/00; G06F 9/945
(52) U.S. Cl. ............... 713/1; 713/2; 713/100; 711/170; 711/171; 711/172; 711/173
(58) Field of Search ................ 713/1, 100, 2; 711/170–173

(56) References Cited

U.S. PATENT DOCUMENTS

| | | | |
|---|---|---|---|
| 4,300,192 A | * 11/1981 | Couleur et al. | 711/153 |
| 5,568,629 A | 10/1996 | Gentry et al. | 395/441 |
| 5,586,301 A | * 12/1996 | Fisherman et al. | 711/152 |
| 5,657,470 A | 8/1997 | Fisherman et al. | 395/480 |
| 5,809,230 A | * 9/1998 | Pereira | 713/200 |
| 5,930,831 A | * 7/1999 | Marsh et al. | 711/112 |
| 5,944,820 A | * 8/1999 | Beelitz | 713/1 |
| 6,324,627 B1 | * 11/2001 | Kricheff et al. | 711/163 |
| 6,385,721 B1 | * 5/2002 | Puckette | 713/2 |

* cited by examiner

Primary Examiner—Thomas Lee
Assistant Examiner—James K. Trujillo
(74) Attorney, Agent, or Firm—David A. Mims, Jr.; Rudolf O. Siegesmund

(57) ABSTRACT

A computer program, installed on a computer, allows a user of that computer to be assigned a personal local data partition and the data to be retained in the partition. When a second user logs on, that user is assigned a different personal data partition. When the computer boots after logon by the second user, the operating system does not see the first users partition and will assign the same drive letter to the second user's partition. The process repeats for any number of users. Therefore, at each boot of the system, the operating system will not see the personal data partitions for any other user than the user who just logged on with his or her individual identification.

6 Claims, 4 Drawing Sheets

SYSTEM FOR MODIFYING A MASTER PARTITION TABLE OF A MASTER BOOT RECORD TO CREATE A PERSONALIZED LOCAL DATA DRIVE HAVING DEDICATED ALLOCATION FOR A SPECIFIED USER

FIELD OF THE INVENTION

The present invention relates to local hard drive partition in general and specifically to assignment of a personalized local data partition during the boot of the workstation where the personalized local data partition can only be accessed by the user who placed the data in that partition.

BACKGROUND OF THE INVENTION

Computers utilize a wide variety of memory devices to store data. One generic type of memory device is typically referred to as a disk. Disks are classified according to the storage 10 medium employed, such as an "optical" disk or a "magnetic" disk. Disks are also generally classified as either "floppy" or "hard." Disks are physically divided up into heads (a.k.a. tracks), cylinders, and sectors. Although a sector may be identified by specifying a head, a cylinder, and a sector within the cylinder, a sector may also be identified by a "logical sector address." Each logical sector address is a single number rather than a triplet of numbers. The logical address of a sector corresponds to the number of sectors between the addressed sector and the "first" sector on the disk along some specified path which traverses all available sectors in order. The first sector is usually known as "sector zero."

Disks are also classified by rules governing the physical organization of data on the disk. Many disks mold the available space into one or more "partitions" by a "partition table" located on the disk. The partition table includes partition identifiers. Each partition identifier includes a starting address, which is the physical sector address of the first sector address of the first sector in the partition in question, and an ending address, which is the physical sector address of the last sector in the partition. These partitions may be linked together to provide a unified storage mechanism for the host computer or network.

When a computer is booted, it processes a series of self tests and then reads the Master Boot Record, or MBR into memory. The MBR contains instructions to locate the disk's system (startup) partition, read the contents of the first sector of the system partition into memory, and then carry out the instructions in that sector.

The hard drive is divided into four primary partitions. The first three are primary and the fourth is extended. The Logical Boot Records are in the extended partitions. For example, A: drive would be the first, designated by 0. B: drive would be the second, designated by 1. C: drive would be the third, designated by 2. The extended drive, D: would be designated by 3 or it could be designated by any number of partitions such as 3,4,5 and so on.

Traditionally, local hard drive partitions are fixed entities, persistent across boots. Personal user data that is destined for the local hard drive is accessible by anyone who shares the same machine. Many corporations have multiple end users using the same machine because of shift work and their local data will remain accessible to all who share the machine.

A need exists for personal local data partitions that are assigned during the boot of the work station. A further need exists for a personal local data partition that allows administrators to configure workstations so they can maintain private local data depending on the user/personality chosen at boot time and continues to keep the non-essential data separate (inaccessible) between boots.

While some operating systems offer persistent assignment of partitions whereby a partition will always be matched to the same physical partition, there are no operating systems that offer multiple user/personality selectability. Therefore, a need exists for a personal partition system that is not dependent on an operating system. A further need exists for a personal partition system that does not require any specific operating system to be running and can provide the same view to any operating system. This is important especially if a workstation has multiple operating systems because no matter which operating system is booted the same partition view will be provided outside and separate from each of the operating systems.

SUMMARY OF THE INVENTION

The invention solving the problem identified above is a computer program which, once installed on a computer, will allow a user to be assigned personal local data partition, and at the boot of the workstation that personalized partition will be assigned a drive letter. When the user logs off his personal data will be retained in the partition. When the second user logs on, that user will be assigned a different personal data partition. When the computer boots after logon by the second user, the operating system will not see the first users partition and will assign the same drive letter to the second user's partition. The process will repeat for any number of users. Therefore, at each boot of the system, the operating system will not see the personal data partitions for any other user than the user who just logged on with his or her individual identification.

Thus, once the program is installed, each user of a particular workstation is assigned a local data partition that is available only for his or her booted session. The next user, after a reboot, gains access to their own personal local data partition. The partition of other users is protected at a machine level and could not even be overridden by the operating system. The resulting configuration allows one or more persistent partitions (including one or more boot partitions) and several user specific partitions. For example, during each boot, the machine would have a C: drive where the operating system is loaded, a D: drive for shared data and an E: drive for personal data. This E drive would be replaced for each user accessing the machine but physically pointing to their own personal partition. All applications would be configured to store personal information on the E: drive which would ensure that each users personal data was stored on their own personal local partition. Also, user logon could be replaced with personality logon whereby each personal local partition becomes a personality partition. In other words, one partition could be an accounting partition with accounting software and data and another partition could be a financial partition with financial software and data. An administrator could have access to all of the partitions for maintenance or other requirements by having an identifier that would be assigned to all of the partitions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
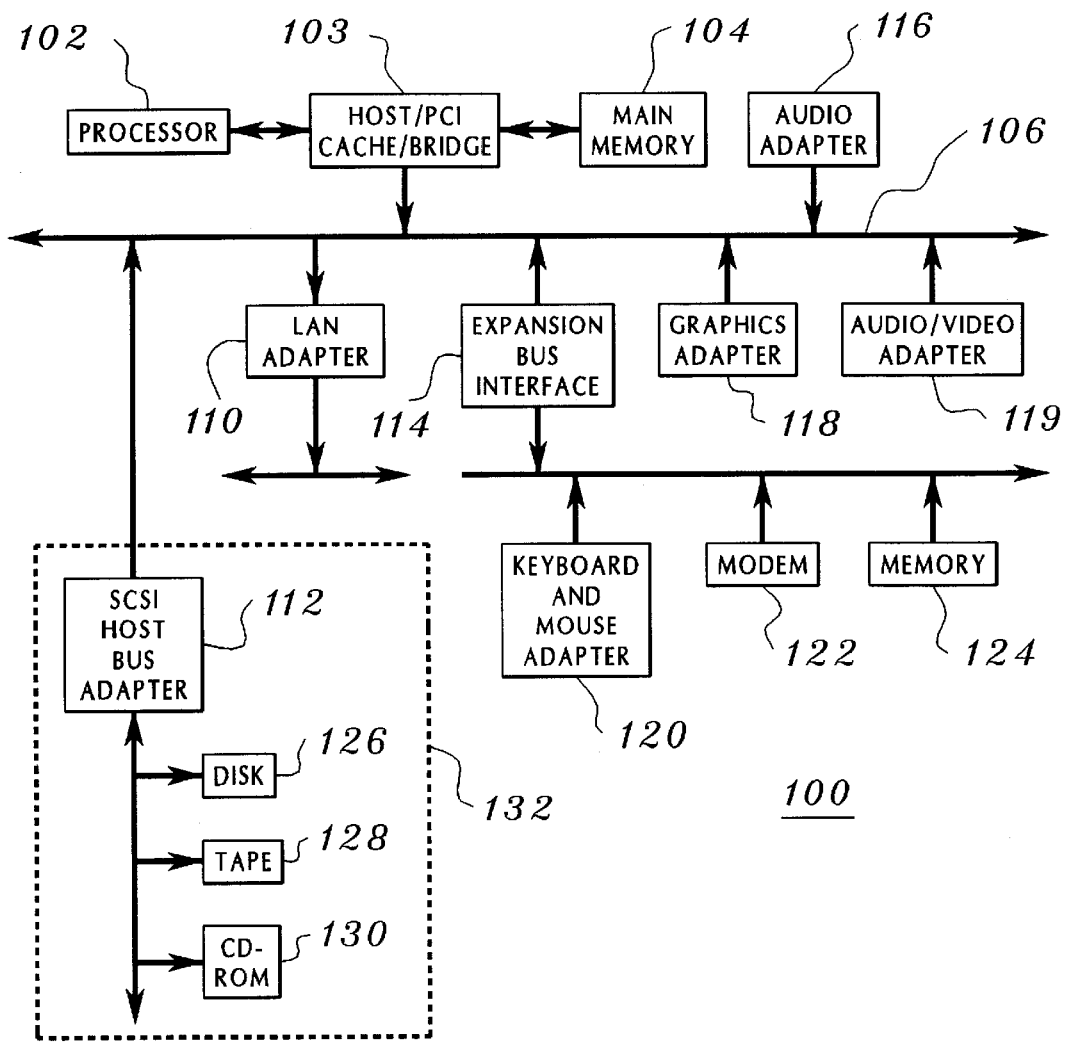
FIG. 1 depicts a data processing system.

FIG. 1, a block diagram, illustrates a data processing system in which the personalized local data drive may be implemented. Data processing system 100 is an example of a stand-alone computer; however, the personalized local data drive may also be implemented in computers linked to a network. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 103. PCI bridge 103 also may include an integrated memory controller and cache memory for Processor 102. Additional connections to PCI local bus 106 may be made trough direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bis 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example. Typical PCI local bus implementations will support three or four PCI expansion slots or add-in connectors. An operating system runs on processor 102 and is used to coordinate and provide control of various components within data processing system 100 in FIG. 1. The operating system may be a commercially available operating system such as OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 100. "Java" is a trademark of Sun Microsystems, Inc. Instructions for the operating system, the object-oriented operating system, and applications or programs may be located on storage devices, such as hard disk drive 126, and they may be loaded into main memory 104 for execution by processor 102. Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the processes of the present invention may be applied to a multiprocessor data processing system. For example, data processing system 100, if optionally configured as a network computer, may not include SCSI host bus adapter 112, hard disk drive 126, tape drive 128, and CD-ROM 130, as noted by the box with the dotted line in FIG. 1 denoting optional inclusion. In that case the computer, to be properly called a client computer, must include some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a Personal Digital Assistant (PDA) device which is configured with ROM and/or flash ROM in order to provide non-volatile memory for storing operating system files and/or user-generated data The depicted example in FIG. 1 and above-described examples are not meant to imply architectural limitations with respect to the present invention. It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such a floppy disk, a hard disk drive, a RAM, and CD-ROMs, and transmission-type media, such as digital and analog communications links.

Figure 2:
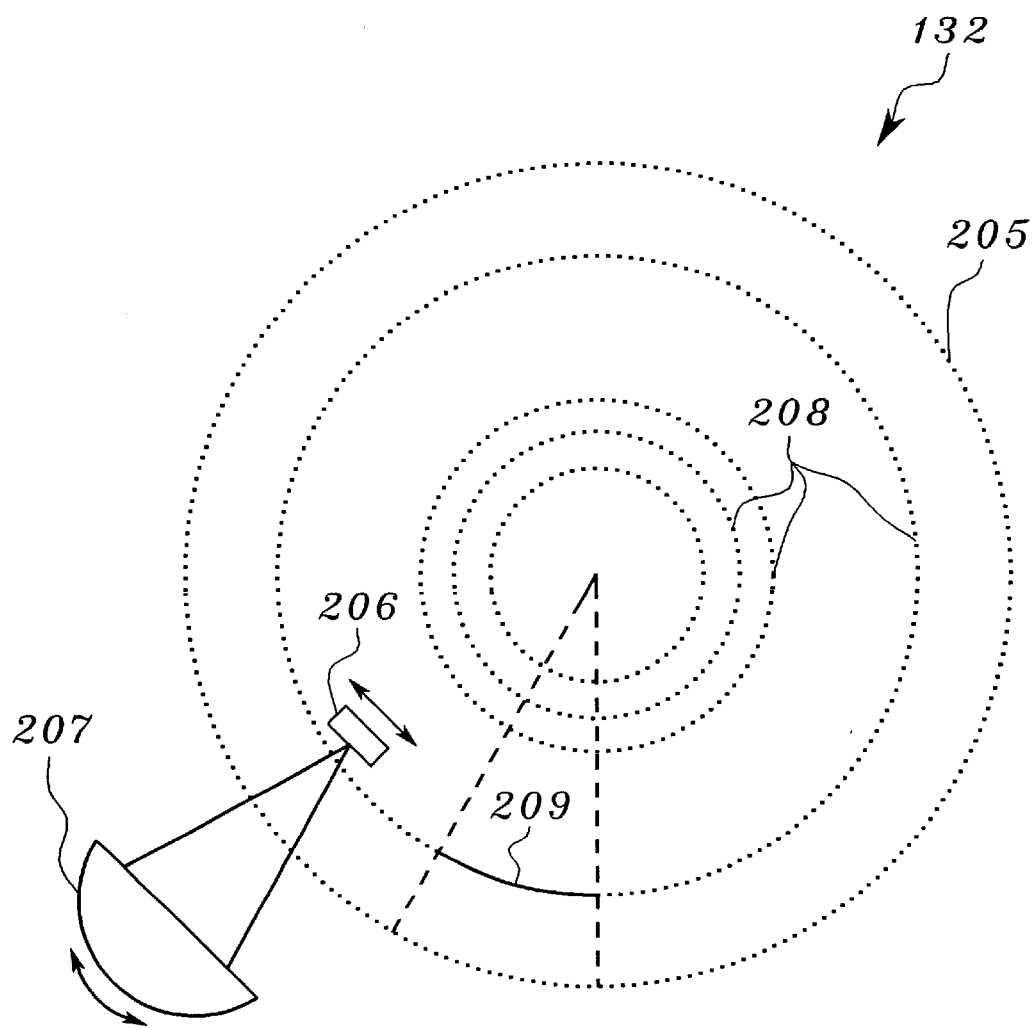
FIG. 2 depicts a hard drive.
Figure 4:
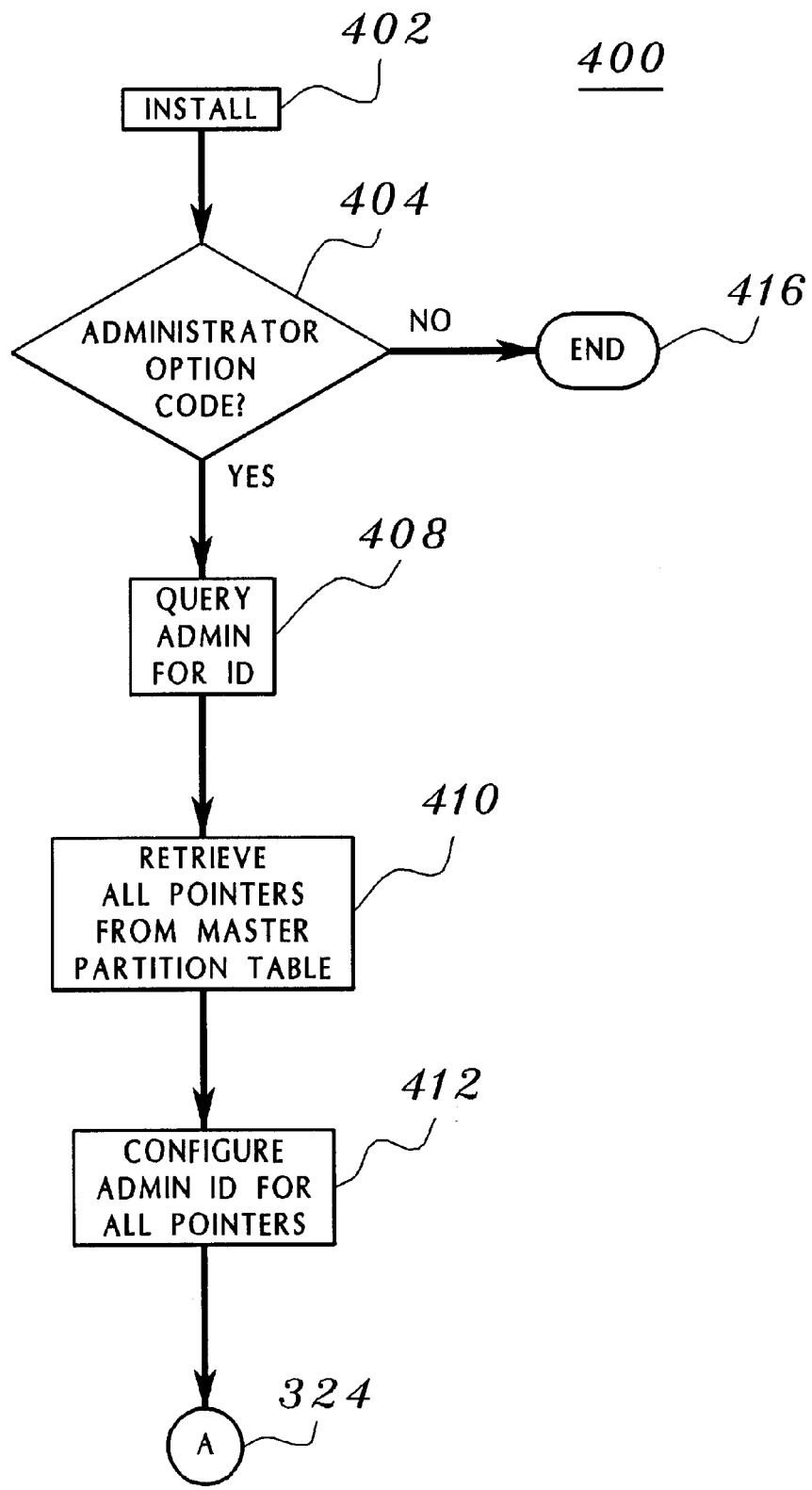
FIG. 4 depicts a flow chart for an administrator subroutine.

Turning now to FIG. 2, there is shown a block diagram of a memory storage disk that may be implemented as disk 126 of FIG. 1 in accordance with the present invention. The sector is the basic addressable unit of the disk 205 as shown in. FIG. 4. Disk 205 is a circular platter having a coating of a ferromagnetic material on a rigid substrate. For reading information from the disk or writing information to the disk, a transducer head 206 is positioned by an actuator 207 over one of a number of concentric bands whose center lines are indicated by the numerals 208. Each "sector," such as sector 209, is an arcuate segment of such a band, of finite extent. Every sector is written in a predetermined format which includes a header, data bytes, error detecting code and error correcting code. Each header is, in turn, a 32-bit quantity that contains the logical address of the sector. There are four copies of the header in every sector. The data bytes are application-specific information recorded on the disk by host and subsystem input/output operations. By convention, there are either 512 or 576 bytes of data in every sector, when standard formats are employed. Sector layout is described in greater detail below.

"Tracks" and "cylinders" are collections of sectors grouped into a hierarchy of categories according to access time latencies. Access time to any sector on a track is a linear function of the distance of that sector from the current sector which is under the read/write head, if on the same track. The first sector on the track immediately follows the last sector with respect to access time considerations. These properties constrain a track into the logical (but not necessarily physical) structure of a ring.

Customarily, in a disk drive, a single head-positioning actuator will be used to position multiple read/write heads which are separated from each other by a fixed distance. When instructed to read or write, a controller determines which of the heads services the addressed portion of the disk and uses that head to perform the operation.

A volume is an ordered collection of sectors which are treated as a single entity/device. The sectors in the volume may come from any disk drive to which the system has access. Thus, a volume may consist of a single partition, an entire drive, multiple partitions residing on a single drive, multiple partitions residing on multiple drives, multiple drives, or any combination thereof Since the present invention handles all of these cases and more, it is convenient to discuss it in terms of its application to volumes, since a volume can represent so many different things.

To go to the particular volume desired, the volume must first be addressed. To be addressed means to reference a particular storage location. The reference is achieved by assigning a number specifying a location on the hard drive where the data for that volume will be stored. The number or address is called a pointer. A pointer is defined as the Cylinder Head Record (CHR) of the physical partition and points to the physical location of the partition.

An example of pointer allocation to users is as follows:

| User | Initialization Parameters | Pointer | Access |
| --- | --- | --- | --- |
| User 1 | 2, 3 | CHR points to physical location of $2^{nd}$ and $3^{rd}$ partitions | Drive C, Drive E: partition 3 |
| User 2 | 2, 4 | CHR points to physical location of $2^{nd}$ and $4^{rd}$ partitions | Drive C, Drive E: partition 4 |
| User 3 | 2, 5 | CHR points to physical location of $2^{nd}$ and $5^{rd}$ partitions | Drive C, Drive E: partition 5 |

In the above example, all three users have pointers to Drive C but each user only has a pointer to a separate partition on Drive E.

Figure 3:
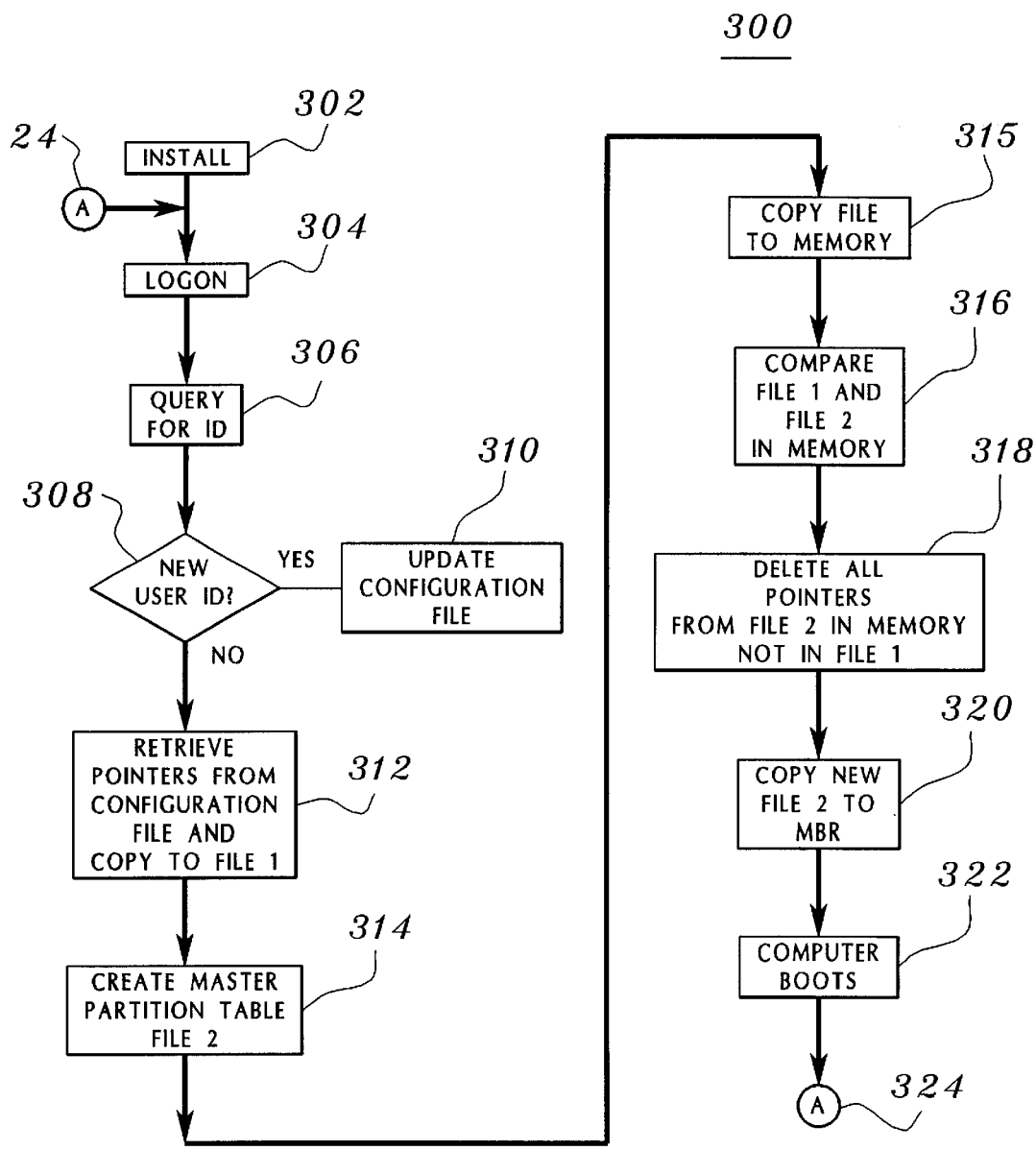
FIG. 3 depicts a flowchart of the program.

FIG. 3 is a flow diagram of the program which is the invention. The program must be installed on the computer. Step 302 represents a standard install routine. Once installed the computer is ready to operate. Step 304 represents a user logging on at the computer. The user could log on at the machine or log on over a network. Next, before the computer boots, the program queries the user for the user's identification (Step 306). On the first logon after installation, every user identification will be new. The program needs to build a configuration file. The program assigns pointers for the personal data partition for that user and places the identification and pointers in a configuration file. On subsequent logons, if the user identification is new, the program establishes a configuration file for each new user identification and corresponding pointers for the personal data partitions assigned to those user. Thus, if the program receives a new user identification, it updates the configuration file (Step 310). Next the program retrieves the pointers for the specific user identification and copies the information to a first file referred to as File 1 (Step 312). The program then goes to the Master Partition Table in the Master Boot Record and makes a copy of the Master Partition Table placing the copy in File 2 (Step 314). Next, the program compares File 1 and File 2 to establish all of the File 2 containing pointers that do not correspond to File 1 (Step 314). The program then deletes all pointers from File 2 which are not in File 1 (Step 318). The program then copies the new (altered) file 2 to the Master Boot Record (Step 320). Now the partition table in the Master Boot Record has been written over and when the operating system is loaded, the operating system will only see the pointers for the user who has logged on. The pointers for other users with personal data partitions will not be "visible" to the operating system. Thus personal data will be copied to drive D by all applications, but the data will be sent to different partitions for different users who all send personal data to Drive D.

In order for an administrator to have access to all of the partitions, the administrator would need to be assigned a user identification corresponding to all of the pointers in the configuration file. A subroutine of the program allows for such an option. In FIG. 4 the administrator's subroutine is installed. The program queries for an administrator option code (Step 404). If the correct code is submitted the program proceeds. If not, the program ends (Step 406). Next, the program will query the administrator for an identification. (Step 408). The program then retrieves all pointers from the Master Partition Table (Step 410). Finally, the program configures the administrator's identification to consist of all of the pointers from the Master Partition Table. The program then proceeds at connection point 324 in FIG. 3.

The method to implement the program is as follows. First, the program must be installed on the computer. Second, at boot of the system, the program queries the user for the user identification. Upon receipt of the user identification, the program retrieves the pointers for that user identification from its configuration file. Third, the program then creates a file copy of the Master Partition Table in memory. Fourth, the program compares the pointers corresponding to the user identification from the configuration file to the pointers in the copy of the Master Partition Table in memory. Fifth, the program deletes all pointers from the copy file of the Master Partition Table in memory which do not correspond to the pointers allocated to the user identification. Sixth, the program takes the altered copy of the Master Partition Table in memory and writes over the partition table in the Master Boot Record. The program is then finished. As Boot proceeds, the operating system that will load will not see any pointers other than those for the user who just logged on, and drive letter E: will be assigned to the personal data partition for that user.

In order for the program to be effective, applications must be modified to send all personal data to drive E:. While any letter would do, the choice of drive letter must be synchronized so that all applications sending data to personal partitions send the data to the same drive letter. This is necessary because, the program is independent of operating systems.

It should be noted that, although the present invention has been described in the context of a memory storage disk, the present invention is equally applicable to other kinds of storage media including but not limited to other types of magnetically readable storage devices, optically readable storage devices, and to both volatile and non-volatile types of storage devices. Furthermore, it should be noted that although the present invention has been described in the context of a 32- bit processor and memory storage unit, other architectural type processors and memory storage units are equally applicable to the present invention; such architectures include but are not limited to 64-bit processing architectures.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disk, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood from the foregoing description that various modifications and changes may be made in the preferred embodiment of the present invention without departing from its true spirit. It is intended that this description is for purposes of illustration in only and should not be construed in a limiting sense. The scope of this invention should be limited only by the language of the following claims.

What is claimed:

1. A method for providing a personalized local data drive in a computer having a personal local data drive program installed and at least one user logging on to the computer, comprising the steps of:

querying for a user identification;

recognizing said user identification;

retrieving user pointers for the user identification from a configuration file copying the user pointers to a first file in memory;

creating a master partition table file;

copying the master partition table to a second file in memory;

comparing the first file in memory and the second file in memory;

creating a new second file in memory by deleting all pointers from the second file in memory that do not match the pointers in the first file;

copying the altered second file in memory to the master boot record of the computer, booting said computer; and wherein said user is unable to access a free space on said data drive unless said free space is specifically allocated to said user.

2. A programmable apparatus for presenting a personal data file to the user of the computer comprising:

programmable hardware comprising;

a computer having a Master Partition Table and a Mater Boot Record; and a program installed on said computer;

wherein said computer is directed by said program to create a user pointer file and to copy the Master Partition Table to a memory file;

responsive to creating said user pointer file and said Master Partition Table memory file, said program further directs said computer to alter said Master Partition Table memory file by deleting all pointers that do not match the pointers in the user pointer file from said Master Partition Table memory file, and to write over the Partition Table in the Master Boot Record with the altered Master Partition Table memory file; and wherein said user is unable to access a free space on said data drive unless said free space is specifically allocated to said user.

3. A computer readable memory for causing a computer to create a personal local data drive comprising:

a computer readable storage medium;

a computer program stored in said storage medium;

the storage medium, so configured by said computer program, responsive to a user logon, causes the computer to request a user identification; and responsive to receiving said user identification, causes the computer to create a pointer file for said user identification and to create a copy of a Master Partition Table in memory;

further causes the computer to compare said pointer file and said copy of a Master Partition Table in memory;

further causes the computer to alter said copy of the Master Partition Table in memory by deleting all pointers that do not match the pointer file;

cause the computer to write the altered Master Partition Table to the Master Boot Record; and wherein said user is unable to access a free space on said data drive unless said free space is specifically allocated to said user.

4. A computer implemented process to create a personal local data partition in a computer comprising:

comparing a user pointer file and a master partition table file in memory;

creating a new master partition table file in memory by deleting all pointers from the master partition table file in memory that do not correspond to the user pointer file;

copying the new master partition table file in memory to the master boot record; and wherein a user is unable to access a free space on said data drive unless said free space is specifically allocated to said user.

5. A method for creating a personalized local data drive, the method comprising the computer implemented steps of:

executing instructions from a computer first memory to obtain user identification at logon;

executing instructions from a computer second memory to create a user pointer file;

executing instructions from a computer third memory to create a Master Partition Table file in memory;

executing instructions from a computer fourth memory to compare said user pointer file and said Master Partition Table file in memory;

executing instructions from a computer fifth memory to delete all pointers in said Master Partition Table file in memory that do not match the user pointer file;

executing instructions from a computer sixth memory to copy the altered Master Partition Table file in memory to the Master Boot Record;

whereby the computer when booted will receive an operating system which will only see the altered Master Partition Table; and wherein a user is unable to access a free space on said data drive unless said free space is specifically allocated to said user.

6. A computer program product on a computer-readable medium for booting a client computer without an operating system, the computer program product comprising:

first instructions from a first memory for loading a set of programs from a second memory, wherein the first memory is a BIOS ROM and the second memory is a nonvolatile, read\write memory;

second inductions from a computer second memory to obtain user identification at logon;

third instructions from a computer third memory to create a user pointer file;

fourth instructions from a computer fourth memory to create a Master Partition Table file in memory;

fifth instructions from a computer fifth memory to compare said user pointer file and said Master Partition Table file in memory;

sixth instructions from a computer sixth memory to delete all pointers in said Master Partition Table file in memory that do not match the user pointer file;

seventh instructions from a computer seventh memory to copy the altered Master Partition Table file in memory to the Master Boot Record;

whereby the computer when booted will receive an operating system which will only see the altered Master Partition Table; and wherein a user is unable to access a free space on a data drive unless said free space is specifically allocated to said user.

* * * * *